Inventors
Frederick Stone,
Albert L. Stone.

Attorney.

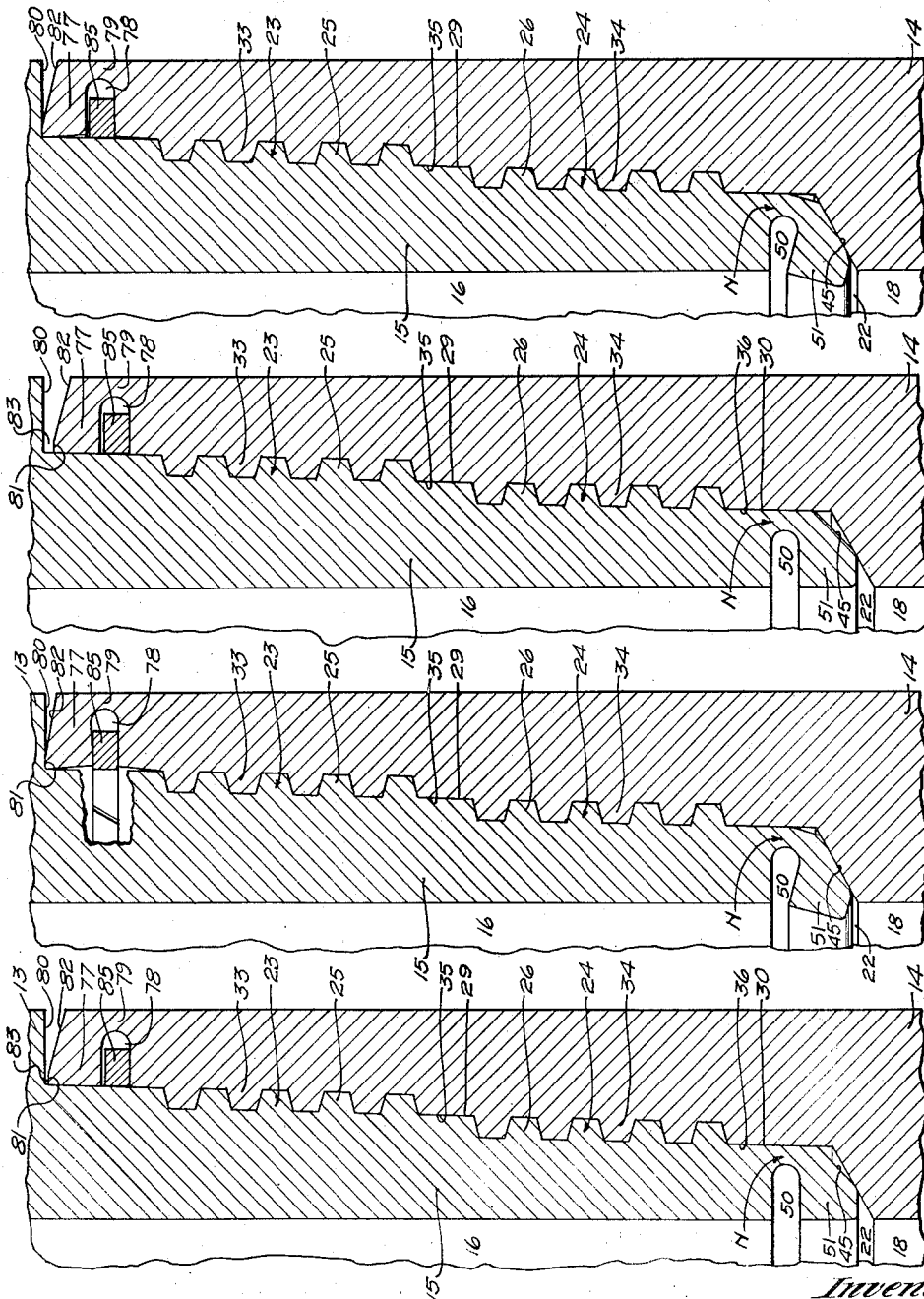

Patented Apr. 29, 1941

2,239,942

UNITED STATES PATENT OFFICE 2,239,942

WELL PIPE JOINT

Frederick Stone, Redondo Beach, and Albert L. Stone, Palos Verdes Estates, Calif., assignors to Hydril Company of California, Los Angeles, Calif., a corporation of California Application May 17, 1939, Serial No. 274,152

3 Claims. (Cl. 285—146)

This invention has to do generally with well pipe joints, and is more particularly concerned with threaded joint members of the box and pin type.

The invention is further concerned, in one aspect, with that type of joint wherein the pin and box members have a plurality of sets of mating shoulders, the sets being spaced longitudinally of the pipe axis and the joint members being so proportionately dimensioned that the sets will make up in predetermined sequence as predetermined torque strains are imposed upon the joint.

While the invention, considered in certain of its aspects, is applicable to any type of joint possessing such plural sets of mating shoulders, it is utilizable to particular advantage in the type of joint shown in Patent No. 1,932,427 issued October 31, 1933, to Frederick Stone, one of the joint-inventors herein, and entitled "Well pipe joint." Accordingly, our major showing of the present invention is illustrated and will be described as embodied in this particular type of joint, but it is clearly to be understood that this showing is not to be considered as limitative on the invention except as to such claims as may be specifically directed thereto. Reference to the type of joint shown in said patent is also helpful in describing the functions of the present invention, and, accordingly, the problems solved by the instant invention may be advantageously presented by reference to the showing of that patent, but, again, it is not to be inferred that this invention is limited in advantageous use to this particular type of joint.

In the aforesaid patent, it is pointed out that there is a differential existing between the seat-spacing on the pin and on the box so that when a given seat or shoulder on the pin engages the mating seat or shoulder on the box, the mating shoulders of the other pair or set are separated by what may be termed a "take-up space." Assuming the first mentioned seats have engaged, in order to engage the other set of shoulders the joint has to be exposed to additional torque strain, and in order to accommodate the relative longitudinal movement between joint parts necessary to accomplish this second seating, the metal of the box and pin, or both, must yield either or both radially and longitudinally, though the proportioning of parts is such that under normal usage the stock, during this displacement, is not stressed beyond its elastic limit.

In order that the joint parts may function as described above and to insure that a tight joint may be made at both sets of shoulders without overstraining the stock during the take-up movement (that is, during the movement after the shoulders of the first set have engaged and up to the time the shoulders of the second set have engaged) it has been found necessary to machine the shoulders and all interfitting parts of the joint with extreme accuracy to secure an exact differential between the seat spacing on the two members and accordingly insuring a "take-up space" of exceedingly accurately measured longitudinal extent. It follows that the allowable tolerance in the differential spacing of seats and therefore the width of take-up space, is exceedingly slight, this condition obviously greatly increasing production costs and demanding a great deal of time and care on the part of the machine operators and inspectors.

It is one of the major objects of our invention to reduce the time, care and expense incident to the manufacture of such joints, without impairing their efficiency, and, in fact, actually increasing their efficiency in certain regards. This is accomplished in general by so fashioning the joint parts that there is allowed an increase in the tolerance of the differential existing between the seat spacing on the pin and box members, or, expressed otherwise, increasing the allowable tolerance in the extent of "take-up space."

We do this by providing one end of either or both box and pin with a spring lip, one face of this lip representing the seating shoulder of the associated member. In any event, one of the members has its first-engaging shoulder provided on such a lip, the lip resiliently yielding as the joint is made up with sufficient torque to engage the other set of mating shoulders. Thus, the relative movement of the metal necessary to allow the taking up of the clearance between the second set of shoulders, is accommodated in large part by resilient movement of the lip rather than requiring longitudinal compression or tension of the mass of the body and pin. At the same time it will be obvious that since the lip is relatively easily bendable it is possible to vary the width of the take-up space within relatively wide limits and yet insure a final seating of the shoulders without the expenditure of great effort and without overstraining any of the joint parts.

The spring-lip effect is gained by cutting an annular groove in the associated member near one end thereof and, as an added feature, where that groove is exposed to effective fluid pressure, such pressure acts against the walls of the groove in a manner tending to press the lip more tightly into sealing engagement with the seat on the other joint part.

It has also been found that by reason of the provision of this resilient lip, whether or not the fluid-pressure is utilized as above, it is possible to obtain tighter seals against the passage of fluid under pressure and also to give increased resistance to accidental unscrewing movements of the joint parts.

Other objects and features of novelty will be made apparent in the following description, wherein reference is made to the accompanying drawings, in which:

Figs. 8 and 9 are similar to Figs. 2 and 3, respectively, except that they show additionally a spring-lip on the box member;

Figs. 10 and 11 are similar to Figs. 8 and 9, respectively, except that they indicate a larger take-up space.

Figures 1, 2, 3:
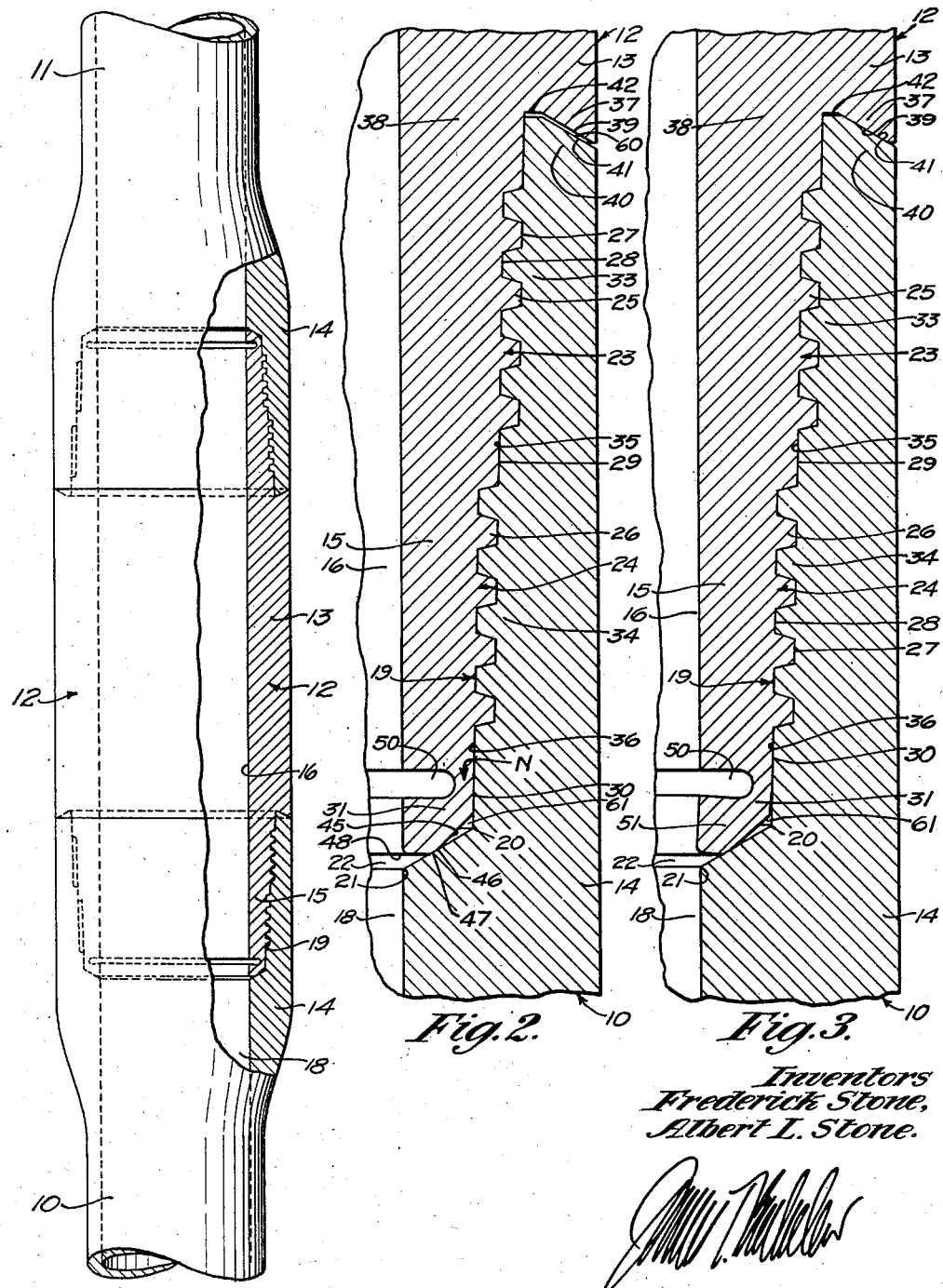
Fig. 1 is a longitudinally contracted elevation, partly in broken-away section, showing a typical embodiment of our invention.
Figs. 2 and 3 are enlarged, fragmentary sections through a joint similar to Fig. 1, showing, respectively, the engagement of the first set of shoulders and the second set of shoulders; the take-up space here being indicated as relatively small.

In the drawings we have, for the sake of clearness, indicated certain of the clearances and metal-displacements, exaggerated to quite an extent beyond actual conditions. We do not attempt to show every evidence of relative movement between parts during the making up of the joint nor the exact final position of every bit of the joint metal after the joint is made up, but the showing is sufficient to illustrate the general character of relative movement and final disposition of parts, and therefore to illustrate the nature and purpose of the invention.

In Fig. 1, lengths of tubing or drill pipe are indicated at 10 and 11, these lengths being adapted to be connected by an intermediate pin member 12. Since the connections between the two pipe lengths and the pin member are the same, we will describe but one in detail, and it will also be understood that while we have shown member 12 as "double-ended," in some situations the member threaded into a given length of pipe will carry at its other end a tool or a type of joint differing from the one we are about to describe or, the pin end may be integral with one length of pipe and screwed directly into the box which is integral with the other length of pipe. Therefore, it is to be understood that the claims are not to be construed as limited to the double-ended pin member shown, nor to the particular nature of the body members which carry the interfitting joint-parts.

Pin member 12 comprises a body portion 13 which is of the same outside diameter as the up-set 14 of pipe 10 (Fig. 2) and an axially projecting pin portion 15 of reduced diameter, a bore 16 extending through the body portion and pin end. The up-set portion 14 of pipe 10 will be considered the box member of the joint, though it is to be understood this up-setting is not essential when the normal walls of a given pipe are sufficiently thick to serve the purpose intended. It will therefore be understood that we may refer broadly to the end of the pipe (or of any equivalent member) which is adapted threadably to receive pin portion 15, as the "box member" of the joint.

The box member is provided with a bore 18 and a counterbore 19, the outer end of the counterbore opening to the free or upper end of the box, and the inner end 20 of the counterbore being spaced axially of the box member from the outer end 21 of bore 18. An annular, tapered shoulder 22 extends from bore to counterbore, which shoulder provides an internal conical seat at the inner end of the counterbore. Though the tapering of this seat is not essential to the invention, considered in its broader aspects, it is normally preferable. Also, though the degree of taper (where used) of this shoulder may vary within wide limits, we have found that the illustrated taper, about 30° with respect to a transverse plane of the joint, is particularly well suited to certain purposes.

Bearing in mind that the following description of the particular thread connection between the pin and box is not to be considered as limiting or controlling on the invention, we will now point out briefly the illustrated form of connection so the later remarks as to sequence of seating, etc., may be understood. The exact nature and functioning of the various elements of the thread connection and associated parts, are fully set up in the aforementioned patent, and therefore need not be repeated in detail here. However, it may be pointed out that the connection is of the two-step thread type, the upper and larger pin-step being indicated at 23 and the lower and smaller step being indicated at 24, the two steps having the same degree of relatively slight taper. On the upper and lower steps are provided threads 25 and 26, respectively, these threads preferably, though not at all necessarily, being of a modified Acme type having outer-peripheral and root-peripheral faces 27 and 28, respectively. At the juncture of the two steps is a smooth conical portion 29 which, in effect, is a tapering continuation of the thread-root-periphery of the larger step and the outer-peripheral-thread-face of the smaller step. The threads on the upper and lower steps, are, of course, matched so when the pin is lowered into the complementary two-step box, the threads of the two pin steps will simultaneously engage the complementary box threads.

The free or distal end 31 of pin portion 15 is unthreaded to provide a smooth conical face 30 which is, in effect, a continuation of the thread-root-peripheral-face of the smaller step.

The counterbore of the box has two-step characteristics complementary to the pin and is also complementarily internally threaded, the upper threaded step being indicated at 33 and the lower threaded step at 34, a smooth conical face 35 being provided at the juncture of the steps and being, in effect, a tapered continuation of the inner peripheral thread face of the upper box step and the thread root face of the lower or smaller box threads. Face 35 is complementary to pin face 29 and the box member has, at the inner end of its counterbore, a smooth conical face 36, which is complementary to pin face 30 and is, in effect, a tapered extension of the inner peripheral face of the thread.

That portion or lip 37 of body 13 which extends radially beyond the base end 38 of pin portion 15 presents a downwardly facing, annular shoulder 39 which is adapted to be in opposition to the outer end 40 of box member 14 when the box and pin are threadably connected. The box thus presents a shoulder 41 which we will term an external shoulder in opposition to external shoulder 39. Preferably, shoulder or face 39 is the outer defining wall of a groove 42 which is cut into the end of the body portion of the pin about the pin-base, said shoulder inclining in a direction opposite that of shoulder 22 and at an angle of about 30°, though, as will be pointed out, this angle is not critical and, may in some cases be at 90° with respect to the axis of the joint.

Shoulder 41 tapers complementarily to shoulder 39, to form an external conical shoulder whereby, when the pin and box member are threadably connected, the overhang or lip 37 overlies the end 40 longitudinally of the joint to prevent the box end from spreading under excessive torque or make-up strain, all as explained in the aforementioned patent.

The distal end 31 of pin 15 has a major taper 45 which is preferably of steeper angle than box shoulder 22; for instance it may be about 45° with respect to a transverse plane of the joint. Taper face 45 terminates at 46, which terminal point lies approximately midway between the inner and outer circumferential bounding lines of end 31, and angles into a seating face 47 which is preferably approximately complementary in taper to box shoulder 22. The width of annular shoulder 47 may vary from practically that of a line, up to the proportion shown or even to a greater width, though preferably it terminates short of the inside periphery of the pin member. Shoulder 47 adjoins a square-cut, outer shoulder 48.

The distal end of the pin member is annularly grooved at 50, the groove opening into bore 16 and extending radially outward to a point beyond initial-contact shoulder 47, as projected vertically, thus providing a reduced neck N, and, due to the inherent resiliency of the joint stock (this stock may, for instance, be an alloy steel, properly tempered to give it the requisite amount of resiliency) that portion 51 of the pin below the groove may be considered as a resiliently yieldable lip which presents shoulders 45, 47 and 48 as downward bounding faces thereof.

The effective normal length of the pin as measured between its shoulders 39 and 47 is greater than the normal effective length of the box as measured between its shoulders 41 and 22, this differential in length accounting for the presence of the "take-up space" and for the sequential seating of shoulders, to be described.

The box and pin threads are here shown somewhat conventionally, actually they preferably have the mating characteristics described in the aforementioned patent, both as to engaging faces and clearance spaces, but it is unnecessary to go into these features in the present consideration, as they are not controlling on the present invention. Preferably, however, when the pin is "stabbed" into the box and then rotated "hand-tight," pin faces 29 and 30 engage box faces 35 and 36, respectively, before shoulder 47 engages shoulder 22. The parts are proportioned, however, so that the pin may be threaded further by additional application of torque strain, as through wrenching apparatus, to seat shoulder 47 on shoulder 22 without necessitating an appreciable amount of coincident displacement of the metal of the box and/or pin by reason of the further wedging of the tapered threads of the pin into the box threads or of conical sections 29 and 30 into the complementarily tapered bores. The differential in seat spacing, spoken of above, is such that when shoulder 47 contacts shoulder 22, shoulders 39 and 41 will be spaced apart as indicated in Fig. 2, the spacing 60 representing what we will term a "take-up space."

Upon threading the pin further into the box by the application of additional torque strain and due to the fact that the application of force on shoulder 47 is at a point radially offset from neck N, lip 51 tends to bend about neck N toward the position shown in Fig. 3, shoulder 47 tending to slide down shoulder 22 but also biting into that shoulder in a manner to form a very tight seal between the lip and box at shoulder 47. In some cases, it may be necessary only to thread the pin down a relatively slight extent, that is to an amount insufficient to seat shoulders 39 and 41, but in any case space 60 is of such dimension and lip 51 has such resilient yieldability that if the pin is threaded down until shoulders 39 and 41 engage, as in Fig. 3, to present a fluid tight external joint, the lip 51 will yield sufficiently to permit such movement without being displaced an amount which will stretch neck N beyond its elastic limit or become permanently "set" in the position it has assumed in Fig. 3. Normally, shoulders 39 and 41 are thus brought to seat either by tong operations before the pipe is lowered in the well, or during drill stem rotation against load, the shoulder engagement thereafter taking much of the torque load. In this connection, the depth, width and location of groove 50 is such that neck N possesses a degree of rigidity ample to carry sufficient shoulder load due to torque strains under abnormally severe working conditions, to prevent overloading of external shoulders 39 and 41.

It will be seen that the space 60 originally present between shoulder 22 and shoulder 45 is reduced in size when the joint parts assume the position of Fig. 3, but under normal circumstances, it is not necessary, in order to maintain a fluid seal at the internal joint, that this space be entirely closed off by seating shoulder 45 fully on shoulder 22.

Since groove 50 opens to the bore of the joint, when fluid under high pressure is present within that bore it acts against the groove walls in a manner tending to more tightly seal the internal joint. At the same time, the resilient effect of the lip is such as inherently to maintain the lip in fluid tight relationship with the opposing shoulder and to offer appreciable resistance to accidental unscrewing of the pin from the box.

Figure 5:
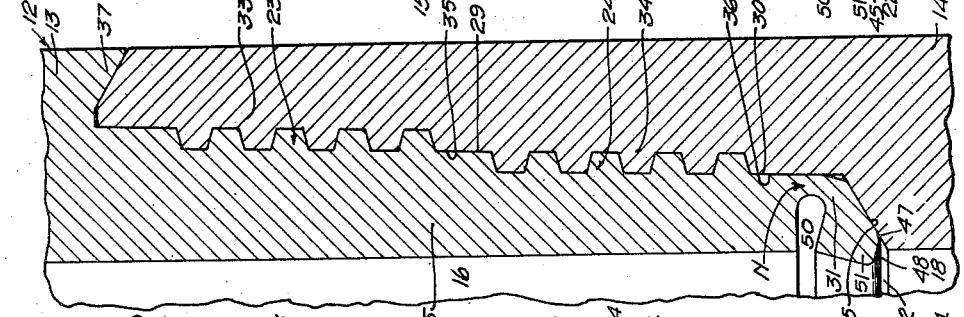
Figs. 4 and 5 are similar to Figs. 2 and 3, respectively, but showing a take-up space of greater extent.
Figure 4:
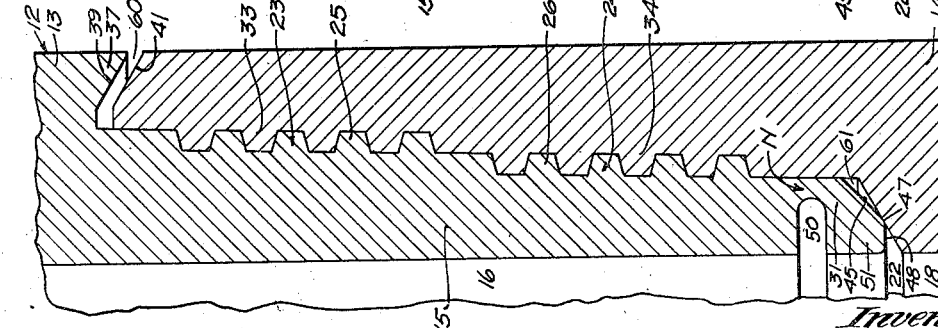

The proportions of all parts illustrated in Fig. 2, except for the shoulder-spacing determining factors, are such that "take-up" space 60 may be increased proportionately to the magnitude indicated in Fig. 4 and the parts will still function satisfactorily. In other words, if the differential in seat spacing is increased to that illustrated in Fig. 4, a relatively greater extent of relative longitudinal movement between box and pin is necessary to seat shoulders 39 and 41 after shoulders 47 and 22 have been seated, and yet the joint accommodates itself to such additional movement without appreciable loss of efficiency. Fig. 5 illustrates, in exaggerated fashion, the position of lip 51 under such conditions after the joint is made up to seat shoulders 39 and 41, it being observed that space 60, present when the joint is in the condition of Fig. 4, provides room for the lip to bend the necessary additional amount, so shoulder 45 may ultimately come into full, fluid tight engagement with shoulder 22, as shown.

From comparison of Figs. 2 and 4, it is apparent that relatively great tolerance is allowable in the differential spacing of the shoulders or, expressed otherwise, in the longitudinal extent of the take-up space. The standard differential in seat-spacing preferably will be about midway between that illustrated in Figs. 2 and 4, but it is possible to go to either of the extremes represented by those figures and still secure full joint efficiency. With such tolerance allowable, it will be realized that the manufacturing problem is reduced most decidedly with relation to that presented when tolerances are close.

Groove 50 is so located and of such size, and all other parts of the joint which have an effect on the bending of the lip are so proportioned, that said lip will not be bent in a manner to stretch the neck N beyond its elastic limit or to cause the lip to become permanently "set" in its distorted condition. Accordingly, when the joint is subsequently broken, the lip will spring back to its normal position or sufficiently close to that normal position to retain substantially its full efficiency in subsequently re-making the joint or in re-fitting the box or pin to other pins or boxes which have been manufactured with the same tolerances.

Figure 7:
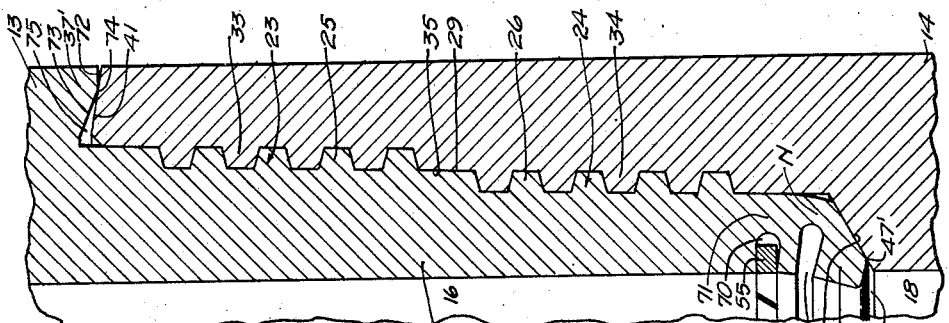
Figs. 6 and 7 are similar to Figs. 2 and 3, respectively, but showing a plurality of grooves in the pin member and showing somewhat different types of external shoulders on the pin and box.
Figure 6:
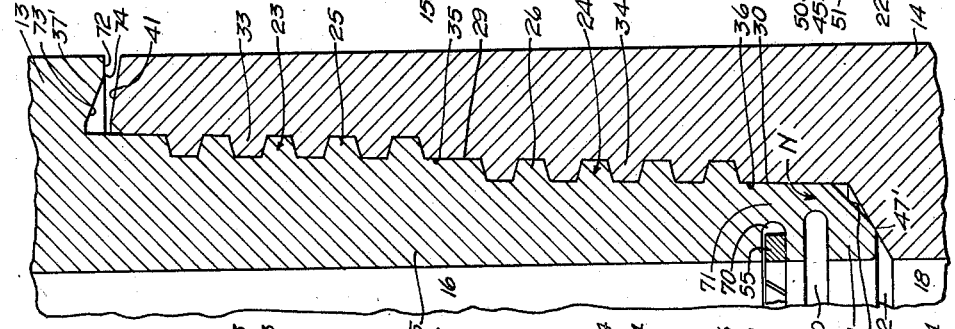

In Figs. 6 and 7, is shown a variation wherein similar parts are given the same reference numerals as in the afore-described figures. Here, however, the shoulder 47' corresponding to shoulder 47, is relatively narrow so, in effect, it has substantially what may be called line-contact with shoulder 22. As the lip 51 moves to the position of Fig. 7, it will slide down and bite into shoulder 22 and may finally reach a position where shoulder 45 is in area contact with shoulder 22. Here, however, there is provided a second groove 70 spaced a little above groove 50 and preferably somewhat less deep. This additional groove gives increased resilient yieldability to the lip due to the formation of the second, reduced neck 71 and thus allows an increase in the degree of the differential spacing between pin and box shoulders.

As a matter of choice, there may or may not be a stop ring such as 55 positioned in one of the grooves, but discussion of this feature will be left to a later point in the specification.

Lip 37' at the base end of the pin has a square cut shoulder 72 which extends inwardly to taper shoulder 73 whereby an initial engaging point or shoulder 74 is formed, the taper of shoulder 73 preferably being a little steeper than that of shoulder 41 at the end of the box, to develop a space 75 therebetween when the joint is made up, though there is sufficient spring to the lip 37' to allow that space to be closed down slightly, as in Fig. 7, when additional torque strain is applied. By spacing the contact shoulder 74 inwardly from the outer periphery of the pin member, it is protected from stabbing damage and the like. In forming this type of external seal, it is found feasible to give shoulder 73 a taper of approximately 22° and shoulder 41 approximately 10°, this difference in taper accounting for the development of space 75.

In Figs. 8 and 9 the formation and operation of the parts making up the internal joint (that is, the joint between the distal end of the pin and the inner end of the box) are the same as described in connection with the foregoing figures. However, in this case, there is also provided a resiliently yieldable lip 77 at the upper end of the box. This lip is formed by providing groove 78 which opens into the counterbore of the box and forms a reduced neck 79. The pin shoulder 80 is here shown as square-cut, as is also the initial-contacting shoulder 81 at the end of the box, said shoulder 81 being in the form of an annulus adjacent the bore of the box and of relatively little radial extent. The end of the box tapers downwardly and outwardly to provide shoulder 82. Numeral 83 indicates the "take-up space" between box and pin, as described previously in connection with the other joint.

In this case, the take-up space 83 is closed as lip 51 moves from the position of Fig. 8 to the position of Fig. 9, but upon application to the joint of additional torque or make-up strain, lip 77 will resiliently yield and assume the position of Fig. 9, thus making the extent of total yieldability possessed by the entire joint of greater magnitude than in the forms shown in Figs. 3 and 6.

However, means is preferably provided whereby the bending movement of lip 77 is positively limited, giving the effect of a final positive stop for the movement of the pin in a direction towards shoulder 82 and thus limiting the extent to which the lower lip 51 may be distorted. This stop means is in the form of a filler ring 85, which, for instance, may be a split spring ring, positioned within groove 78, the ring being of a thickness less than the width of groove 78, measured vertically. The ring 85 thus limits the bending movement of lip 77 to the extent shown in Fig. 9, which extent is less than that which would stretch neck 79 beyond its elastic limit or give to the lip a permanent set. The ring stops radially short of the rounded bottom of the groove and hence does not interfere with neck flexure until the outer free end of said lip engages the top face of the ring, as shown in Fig. 9. As noted above, as soon as ring 85 is engaged by lip 77, further penetration of the pin into the box is prevented, thus limiting the extent to which the lower lip 51 is distorted and preventing it from bending to an extent which will cause a permanent set.

Now returning to Figs. 6 and 7 for a moment, it will be seen that ring 55 functions to limit the extent to which groove 70 may be closed under the lip-bending forces imposed on the distal end of the pin. Ring 55 is of less width than is the groove and, as is true in all situations where a stop ring has been or will be described, the proportionate width of the groove and ring may be varied, as may also be the depth of the grooves, to give any desired degree of yieldability and extent of flexure to the lip, within reasonable limits, so the lip may be fashioned to function properly under different given joint-proportions and under different given operating conditions.

Preferably, where used in connection with a plural-groove construction, as in Figs. 6 and 7, the stop ring will be inserted in the groove which first tends to close, thus forming a positive stop for the first-yielding portion of the lip, whereupon subsequent bending effect is concentrated on the lip at points removed from said first-yielding portion. Control is thus had by which the bending effect may be progressively shifted to various portions of the lip or, more broadly, to various portions of the grooved joint-members, for the purpose of meeting different given conditions.

Fig. 10 and 11 are similar to Figs. 8 and 9, respectively, except that here the differential spacing of pin and box shoulders is increased to an extent which increases take-up space 83 an appreciable amount, and yet in spite of that increase, the joint remains efficient in all its described characteristics. In this case, since space 83 is of greater width, lip 77 will bend to a lesser extent by the time the lower lip 51 has assumed its position of Fig. 11, than in the case of Figs. 8 and 9, it being indicated in Fig. 11 that the lip has not quite contacted the spacer ring. Of course, the joint can be made up still tighter than is represented in Fig. 11, by threading the pin into the box until lip 77 does, in fact, contact the spacing ring, (with consequent greater bending of lip 51) but with the proportionate tolerance shown in Fig. 10 under certain conditions sufficiently tight internal and external joints may be made before the upper lip has contacted its spacer ring.

It will be understood that the standard extent of take-up space will preferably be about midway between that illustrated in Figs. 8 and 10, but these figures indicate proportionately the plus and minus tolerances which are permissible without detracting from the efficiency of the joint.

As has been said, the drawings show exaggerated clearances and hence exaggerated tolerances. It has been found in actual practice, however, that in a 16 lb. pipe of 4½" outside diameter (the measurement being taken on the pipe at one side of the up-set) the provision of the spring lip on the pin end, alone, allows an increase in tolerance of about .008" over the tolerance limits of an unequipped joint. It will be realized that this appreciably greater latitude in tolerance greatly reduces the manufacturing problem.

The immediately above remarks as to the exaggeration of the tolerance indication, applies to all the figures of the drawings.

It may be noted that in all forms where a limit ring is used, advantage is had on the one hand of a relatively wide and deep groove to give a neck of sufficient length and of such thickness as to permit relatively free flexure of the lip, and on the other hand, the effect of a relatively narrow and shallow groove for limiting the extent of such flexure to a degree which will prevent the neck from being stretched beyond its elastic limits or becoming permanently set in distorted condition.

While we have shown and described several embodiments of our invention, it will be understood various changes in design, structure and arrangement may be made without departing from the spirit and scope of the appended claims.

I claim:

1. A well pipe joint embodying an internally threaded box member and an externally threaded, tubular pin member adapted to be threadably connected, an internal seating shoulder on the box member, a mating seating shoulder at the distal end of the pin member, one of said shoulders being formed to initially engage the other shoulder only at a point intermediate the limits of the transverse extent thereof, an external seating shoulder on the box member, and a mating seating shoulder at the base end of the pin member, the normal effective longitudinal extent of the pin member measured between its shoulders being greater than the normal effective longitudinal extent of the box member measured between its shoulders whereby, when the joint is made up with predetermined torque strain, the shoulder on the distal end of the pin member seats on its mating box shoulder before the other mating shoulders engage one another, said pin being provided with an annular groove which opens to the bore of the pin and extends radially to a point beyond said intermediate point, said groove being located adjacent the shoulder on the distal end to provide a spring lip presenting that shoulder as one of its faces, said lip being adapted to yield resiliently when said joint is subjected to additional torque strain of a magnitude sufficient to seat the other shoulders of the joint.

2. A well pipe joint embodying an internally threaded box member and an externally threaded, tubular pin member adapted to be threadably connected, an internal seating shoulder on the box member, a mating seating shoulder at the distal end of the pin member, one of said shoulders being formed to initially engage the other shoulder only at a point intermediate the limits of the transverse extent thereof, an external seating shoulder on the box member, and a mating seating shoulder at the base end of the pin member, the normal effective longitudinal extent of the pin member measured between its shoulders being greater than the normal effective longitudinal extent of the box member measured between its shoulder whereby, when the joint is made up with predetermined torque strain, the shoulder on the distal end of the pin member seats on its mating box shoulder before the other mating shoulders engage one another, and said pin being provided with a plurality of spaced grooves which open to the bore of the pin and extend radially beyond said intermediate point, said grooves being located adjacent the shoulder on the distal end to provide a spring lip, said lip being adapted to yield resiliently when said joint is subjected to additional torque strain of a magnitude sufficient to seat the other shoulders of the joint.

3. A well pipe joint embodying an internally threaded box member and an externally threaded, tubular pin member adapted to be threadably connected, an internal seating shoulder on the box member, a mating seating shoulder at the distal end of the pin member, one of said shoulders being formed to initially engage the other shoulder only at a point intermediate the limits of the transverse extent thereof, an external seating shoulder on the box member, and a mating seating shoulder at the base end of the pin member, the normal effective longitudinal extent of the pin member measured between its shoulders being greater than the normal effective longitudinal extent of the box member measured between its shoulders whereby, when the joint is made up with predetermined torque strain, the shoulder on the distal end of the pin member seats on its mating box shoulder before the other mating shoulders engage one another, said pin being provided with an annular groove which opens to the bore of the pin and extends radially to a point beyond said intermediate point, said groove being located adjacent the shoulder on the distal end to provide a spring lip presenting that shoulder as one of its faces, said lip being adapted to yield resiliently when said joint is subjected to additional torque strain of a magnitude sufficient to seat the other shoulders of the joint, and said box member having an internal annular groove adjacent said external shoulder and providing a spring lip presenting said external shoulder as one of its faces, said lip being adapted to yield resiliently when the joint is subjected to torque strain of still greater magnitude.

FREDERICK STONE.
ALBERT L. STONE.